United States Patent
Marchand et al.

(10) Patent No.: US 10,390,069 B2
(45) Date of Patent: Aug. 20, 2019

(54) ADAPTIVE BROADCASTING OF MULTIMEDIA CONTENT

(71) Applicant: Orange, Paris (FR)

(72) Inventors: Herve Michel Marchand, Vern sur Seiche (FR); Mathieu Rivoalen, Lannion (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/038,065

(22) PCT Filed: Nov. 17, 2014

(86) PCT No.: PCT/FR2014/052941
§ 371 (c)(1),
(2) Date: May 20, 2016

(87) PCT Pub. No.: WO2015/075366
PCT Pub. Date: May 28, 2015

(65) Prior Publication Data
US 2016/0323617 A1    Nov. 3, 2016

(30) Foreign Application Priority Data

Nov. 22, 2013   (FR) ...................... 13 61519

(51) Int. Cl.
| | |
|---|---|
| *H04N 21/2662* | (2011.01) |
| *H04N 21/2343* | (2011.01) |
| *H04N 21/2365* | (2011.01) |
| *H04N 21/262* | (2011.01) |
| *H04N 21/643* | (2011.01) |
| *H04N 21/845* | (2011.01) |

(52) U.S. Cl.
CPC ... *H04N 21/2662* (2013.01); *H04N 21/23439* (2013.01); *H04N 21/23655* (2013.01); *H04N 21/26258* (2013.01); *H04N 21/64322* (2013.01); *H04N 21/8456* (2013.01)

(58) Field of Classification Search
None
See application file for complete search history.

(56) References Cited

U.S. PATENT DOCUMENTS

| | | | |
|---|---|---|---|
| 2005/0187960 A1* | 8/2005 | Nomura | H04L 29/06027 |
| 2005/0289618 A1* | 12/2005 | Hardin | H04L 47/15 |
| | | | 725/95 |
| 2006/0215760 A1* | 9/2006 | Monaco | H04N 21/2365 |
| | | | 375/240.16 |

(Continued)

OTHER PUBLICATIONS

International Search Report dated Feb. 9, 2015 for corresponding International Application No. PCT/FR2014/052941, filed Nov. 17, 2014.

(Continued)

*Primary Examiner* — Alexander Q Huerta
(74) *Attorney, Agent, or Firm* — David D. Brush; Westman, Champlin & Koehler, P.A.

(57) ABSTRACT

A method of managing a multimedia content suitable for being played back by a terminal of a network connected to a service gateway. The content is suitable for being transcoded at a plurality of initial levels and at least one target level. The method includes receiving a request for playing back the content at a first initial level and updating at least one target level while taking account of the initial level.

16 Claims, 3 Drawing Sheets

(56) References Cited

U.S. PATENT DOCUMENTS

| | | | |
|---|---|---|---|
| 2007/0002868 A1* | 1/2007 | Qian | H04W 28/24 370/395.21 |
| 2008/0101405 A1* | 5/2008 | Wirick | H04N 21/2365 370/468 |
| 2011/0188567 A1* | 8/2011 | Blum | H04L 1/0002 375/240.02 |
| 2011/0255555 A1* | 10/2011 | Alexander | H04N 21/23805 370/468 |
| 2012/0180101 A1* | 7/2012 | Davis | H04N 21/23608 725/116 |
| 2013/0044807 A1* | 2/2013 | Lamy-Bergot | H04N 21/234327 375/240.03 |
| 2013/0058393 A1* | 3/2013 | Soroushian | H04N 21/234372 375/240.01 |
| 2013/0219074 A1 | 8/2013 | Dahl et al. | |
| 2014/0229604 A1* | 8/2014 | Pfeffer | H04L 47/822 709/224 |
| 2014/0310424 A1* | 10/2014 | Andersson | H04L 65/4084 709/231 |
| 2014/0359155 A1* | 12/2014 | Wan | H04L 65/4076 709/231 |
| 2014/0359166 A1* | 12/2014 | Mamidwar | H04N 21/23439 709/247 |
| 2016/0191934 A1* | 6/2016 | Kraiman | H04N 19/132 375/240.03 |
| 2016/0316174 A1* | 10/2016 | Whynot | H04L 49/35 |
| 2017/0272790 A1* | 9/2017 | Miles | H04N 21/23439 |

OTHER PUBLICATIONS

English translation of the Written Opinion dated Feb. 9, 2015 for corresponding International Application No. PCT/FR2014/052941, filed Nov. 17, 2014.

\* cited by examiner

ADAPTIVE BROADCASTING OF MULTIMEDIA CONTENT

CROSS-REFERENCE TO RELATED APPLICATIONS

This Application is a Section 371 National Stage Application of International Application No. PCT/FR2014/052941, filed Nov. 17, 2014, which is incorporated by reference in its entirety and published as WO 2015/075366 A1 on May 28, 2015, not in English.

Technical Field

The invention relates to communicating multimedia contents. The term "multimedia content" is used to mean any audio or video content, or more generally any other digital content.

The invention relates more specifically to preparing, transmitting, and receiving video contents on a network, in particular by continuous downloading, also known as "streaming", of multimedia contents on a local network by using client terminals that are capable of accessing such content (and referred to below more simply as "terminals").

State Of The Art

In order to access multimedia content on an Internet type network, or in similar manner on a local network, i.e. a network that connects together with or without wires pieces of terminal equipment in a home or a business (computers, peripherals for printing, storage, etc.), a client terminal generally makes a request as follows: a first step consists in downloading from a first server a document that describes the parameters for accessing the service via the hypertext transport protocol (HTTP), which is a client-server communications protocol that has been developed for Internet networks, and in particular for the web. The document may be a computer file or a data set descriptive of the content that is accessible at a certain address on a second server, referred to as a "content server". Below, the term "description file" is used to refer to this file or data set. During a second step, the client terminal accesses the content on the second server and the service actually begins, i.e. the client terminal can receive the content and consume it (view it, play it, etc.).

In the context of the HTTP protocol, in order to exchange data between the client terminal and the server, recourse is often had to a technique known as HTTP adaptive streaming (HAS). This type of technique serves in particular to provide the user with a good experience while taking account, by way of example, of bandwidth variations on the link between the client terminal and the content server. Conventionally, various streams are encoded or transcoded for given multimedia content, e.g. a digital video, the streams corresponding to different data rates, different resolutions, different qualities. Below, the term "level" is used for a multimedia stream to designate a certain quality and/or data rate and/or spatial or time resolution of the content, particularly but not exclusively for video.

The purpose of video coding is to provide a representation of the initial content of the video in compliance with certain parameters (mean data rate, instantaneous data rate, coding-decoding standard used, spatial resolution, frequency resolution, etc.) in a form that is generally more compact. Transcoding consists in re-encoding a video that is already encoded, but with new parameters. Each level is itself subdivided into time segments, which are also referred to as "chunks", that generally correspond to a few seconds of content. These various levels and the associated segmentation are generally described in the description file.

Several solutions exist for facilitating the availability and the distribution of such content by streaming, such as for example the proprietary solutions known as Microsoft Smooth Streaming and Apple HTTP Live Streaming (HLS), or indeed the MPEG standard (ISO/IEC 23009-1:2012(E)) for dynamic adaptive streaming over HTTP (DASH), which is a standard of the ISO/IEC organization that is dedicated to streaming multimedia contents over the Internet. That standard serves in particular to enable peripherals that are connected to the network (TVs, tablets, etc.) to consume terminal contents via the HTTP protocol. With MPEG DASH, access to content is conventionally performed in two stages:

1) Obtaining a description file, typically by downloading via an HTTP address a file that contains specifically the addressees of the media chunks of the multimedia content (e.g. a file having the extension ".mpd" for "media presentation description").

2) Obtaining the media chunks, typically by downloading, using content addresses in the description file.

From the various chunks that it finds proposed in the description, the client terminal thus selects the most suitable video coding format, etc., as a function of certain criteria, such as its decoding capabilities, the size of its screen, the available bandwidth. In order to adapt this selection over time, as a result of such criteria varying (e.g. changes in the bandwidth), the level of the chunks may vary dynamically throughout the time the video is being read.

Below, it is considered that the client terminal is connected to a "service gateway", i.e. a piece of network equipment that is capable of providing it with access to the contents, either directly or indirectly. This type of equipment may also be referred to as a multimedia content server, or a service platform, or a home gateway, or a business local network gateway, etc.

Assuming that some video content, referred to as "initial" content, reaches the service gateway, it needs to be transcoded into as many levels as there are different data rates/qualities/resolutions proposed in the description file, thereby leading to great complexity in the transcoding module, which requires very considerable encoding capabilities. Furthermore, the service gateway needs to store or cause to be stored all of the transcoded levels, thereby requiring large storage capacities.

Thus, it is generally not possible to store more than four or five different levels for the same initial video content. In order to accommodate this limitation, the number of "levels" available in the description file is voluntarily limited, and as a result the level selected by the client terminal may be far from the optimum level: for example, it may be decided voluntarily to limit the number of levels for delivering streams to levels that correspond to predefined qualities (high definition—HD, standard definition—SD, and reduced definition—RD). A request from the client to obtain a given data rate will lead to the closest lower level being supplied.

Nevertheless, it often happens that the terminals in the pool of terminals are very heterogeneous, i.e. with capabilities that are very different and with capabilities that also vary in time. It may be that the proposed levels are not globally satisfactory for all of the terminals, since the proposed qualities are too remote from the real characteristics of the client.

The invention provides a solution that does not present the drawbacks of the state of the art.

THE INVENTION

For this purpose, in a functional aspect, the invention provides a method of managing a multimedia content suitable for being played back by a terminal of a network connected to a service gateway, said content being suitable for being transcoded at a plurality of initial levels and at least one target level, said method being characterized in that it comprises the steps of:

receiving a request for playing back a content at a first initial level; and updating at least one target level while taking account of said initial level.

The invention thus makes it possible to distribute the target levels as well as possible as a function of clients and of their characteristics in terms of resolution, data rate, bandwidth, hardware and software capabilities, etc. This optimum distribution may in particular take account of all of the clients connected to a content server at a given instant. It makes it possible to determine clusters of similar clients on the basis of statistical criteria, e.g. clients having one or more of their characteristics that are the same or similar, each client in a given cluster being allocated to a target level that can itself be varied, and as a result that is suitable for representing as well as possible and at any instant the cluster of clients by tracking how the cluster varies statistically. Furthermore, the invention makes it possible to off-load the service gateway since the number of target levels can be much smaller than the number of initial levels. By way of example, if three target levels are calculated, it suffices for the gateway to transcode the video content using those three target levels instead of using all of the initial levels proposed in the content description file, which may be very numerous, and which is extremely expensive for the gateway in terms of transcoding, hardware, and/or software resources.

In a particular implementation of the invention, a method as described above is further characterized in that the step of updating at least one target level is followed by the steps of:

causing the multimedia content to be transcoded at said at least one updated target level; and making the content available at the target level.

In this implementation, it is thus possible to use the transcoder that is best adapted to the requested content for delivering that content, i.e. typically to use the transcoder having a target level that is immediately below the requested level.

Another advantage of this implementation is to generate levels that are generally useful for clients: specifically, if the number of target levels is small and the number of clients is large, the transcoded target levels are very likely all to be used by one or several clients, whereas the initial levels may lead to transcoding that is of no use insofar as any one initial level from a very large number of initial levels has a lower probability of actually being selected and consumed by a client.

In a second particular implementation of the invention, which may be used as an alternative to or together with the above implementation, a method as described above is also characterized in that the initial levels specify at least one lower data rate bound and at least one upper data rate bound, and in that at least one data rate of a target level lies between the lower data rate bound and the upper data rate bound.

An advantage of this variant is that it makes it possible for the description file no longer to specify a large number of initial levels, but rather a set of ranges that are defined by upper and lower bounds for the data rate of a client request. An output target level can then advantageously be calculated for each range of the invention, as a function of statistics calculated concerning the clients to be found in this particular range.

In a third particular implementation of the invention, that may be performed as an alternative to or together with the above implementations, such a method is further characterized in that the initial levels are described in a description file of the digital content.

This implementation of the invention makes it possible in simple manner to describe a very large number of initial levels and it can be made compatible with the MPEG-DASH standard if the file is a manifest file in compliance with that standard, or with any other standard that makes use of an above-mentioned description file.

In a fourth particular implementation of the invention, that may be performed as an alternative to or together with the above implementations, such a method is further characterized in that at least one target level is calculated as a function of a number of terminals capable of accessing it.

This implementation of the invention makes it possible to manage a pool of clients as well as possible by associating each level with a number of clients likely to access it. In particular, it can be required that all clients are capable of accessing at least one target resolution, which should preferably then be the lowest target level (the lowest data rate). The number of clients allocated to a cluster may be absolute or relative, in which case it represents a percentage of the number of clients connected: as a result, by means of the invention, it is possible to ensure that a certain percentage of clients, at a given instant, can access a given target resolution level: for example, one-third of clients may access high definition (HD), one-third may access standard definition (SD), and the last third may access the lowest resolution and/or data rate of the low level (LSD).

In a hardware aspect, the invention also provides a device for managing a multimedia content suitable for being played back by a terminal of a network connected to a service gateway, said content being suitable for being transcoded at a plurality of initial levels and at least one target resolution, said device being characterized in that it comprises:

a module for receiving a request for playing back a content at a first initial level; and a module for updating at least one target level while taking account of said initial level.

In another hardware aspect, the invention also provides a service gateway including a device as claimed above for managing a multimedia content.

In another hardware aspect, the invention also provides a computer program including code instructions for performing a method of managing a multimedia content as described above when the program is executed by a processor.

In another hardware aspect, the invention relates to a processor-readable data medium containing a program including program code instructions for executing steps of the above-defined method.

The hardware aspects of the invention procure at least the same advantages as those procured by the functional aspect method.

The invention can be better understood on reading the following description given by way of example and made with reference to the accompanying drawings.

THE FIGURES

DETAILED DESCRIPTION OF AN EMBODIMENT ILLUSTRATING THE INVENTION

Figure 1:
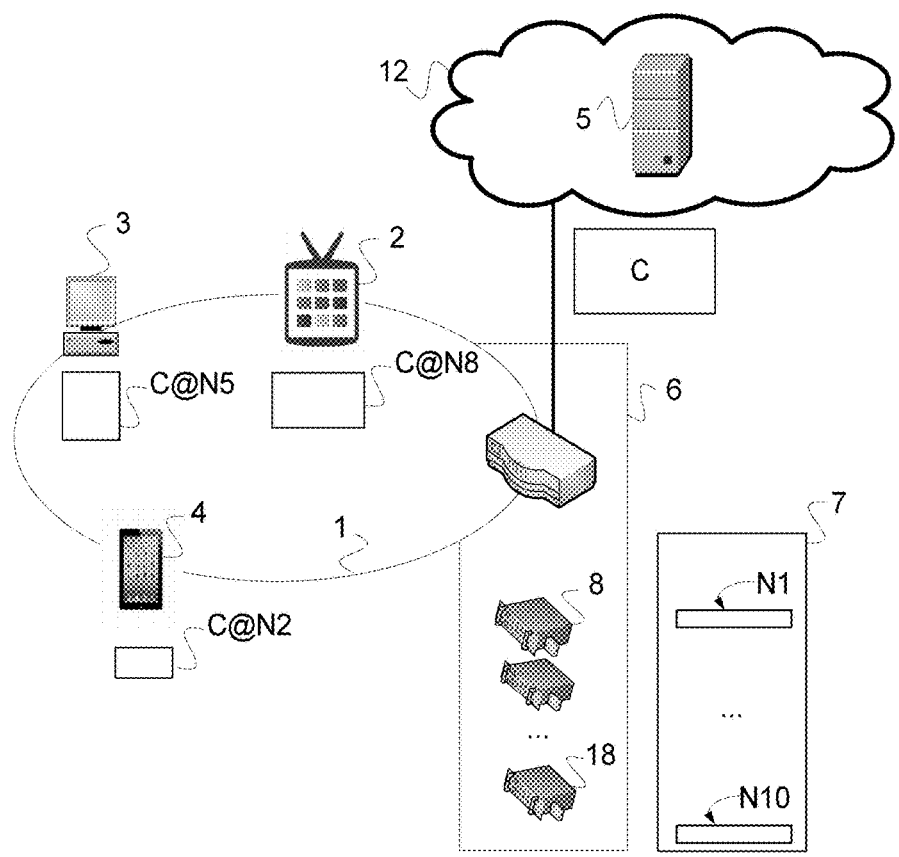
FIG. 1 shows a streaming architecture in a prior art local network.

FIG. 1 shows an adaptive streaming architecture based on the use of the HTTP protocol in a prior art local network. The context of the local network is given by way of example and can easily be transposed to the context of any Internet network.

Conventionally, a client terminal (2-4) seeks to enter into communication with a content server (5) to download a multimedia content made up of one or more media (audio, video, etc.). In this example, the contents are live contents, i.e. for delivering in real time to clients.

In this example, the content server is in the broadband network (12), but in another example it could be situated in a business local network (1), more specifically in the service gateway (6) or in any other piece of equipment capable of hosting such a content server.

Each of the terminals (2-4) possesses its own characteristics in terms of decoding, display, etc. capabilities. For example, the figure shows diagrammatically three different levels corresponding to different data rates and resolutions (N2, N5, N8) for the video sequence (C) that is for the three terminals shown: the lowest resolution (N2) for the tablet (C@4), an intermediate resolution (C@N5) for the computer (3), and high resolution (C@N8) for the TV set (2).

The terminal may be a terminal of the local network (1) or more generally it may be located on a data network, being connected to a service gateway (6), e.g. via a mobile terminal on a mobile network (3G, 4G, etc.).

In this example, the service gateway (6) serves to route data between the broadband network (12) and the local network (1), to manage multimedia contents in particular by receiving them from the broadband network (12) or the local network (1), and transcoding them by means of transcoders (8-18) that are attached thereto. Typically, the transcoders (8-18) may be located in the broadband network (12), or in a business local network (1), in particular at the service gateway.

Each level transcoded by one of the transcoders (8-18) is stored in the service gateway (6), or alternatively in some other storage space available to the service gateway (6) as situated in the local network or outside it.

In the example described below, it is assumed that the adaptive streaming context is in compliance with the MPEG-DASH standard.

The terminal (2-4) begins by interrogating the service gateway (6) to obtain an address of the description file (7) for the desired multimedia content (C). The service gateway (6) responds by supplying the terminal with the address of the description file. Below, this document is a "manifest" file in compliance with the MPEG-DASH standard (C.mdp). Alternatively, the file could be recovered directly from an Internet server that is local or external to the local network, or it may already be available at the service gateway at the time of the request. It could also correspond to some other description format, as mentioned above. It should be observed that the description file is not essential for performing the invention, with it being possible for each terminal to decide, ignoring a context of standardization, the level (data rate/resolution) that is appropriate for that terminal and without the help of such a file.

An example of a manifest file (MPD) complying with the MPEG/DASH standard and including the description of ten levels (N1-N10) for the fragmented content C is given in Appendix 1.

This MPD file describes the chunks of the content corresponding to a certain level and makes it possible to generate their addresses (uniform resource locators or "URLs"). In this simplified example, the addresses are generated using elements "BaseURL" ("http://x.com/content") and "SegmentList" that lists the additional portions of the addresses of the various chunks: "content is_1s_500kb/content 1s1.m4s" for the first chunk of one second of the sequence "content" at 500 kilobits per second (kbps) in the MPEG-4 format (m4s), "content_1s_500kb/content_1s2.m4s" for the second chunk, etc.

The field "duration" specified as an attribute of the "Segment List" beacon gives the duration of a segment in seconds. The field "codecs" of the representation indicates that an AVC type encoder is used, etc.

Thus, the URLs giving access to the first two video chunks for level N1, corresponding to the lowest data rate of 500 kbps in this example, are as follows:
http://x.com/content/content_1s_500kb/content_1s1.m4s
http://x.com/content/content_1s_500kb/content_1s2.m4s Once these chunk addresses are available, the client terminal (2-4) proceeds to obtain media chunks by downloading from those addresses. It should be observed that this downloading conventionally takes place via an HTTP URL, but it could equally take place via a universal address (uniform resource identifier or "URI") describing another protocol (e.g.: dvb://mycontentsegment).

At present, multiple transcoding accompanied by an appropriate description thus makes it possible to access a certain number of video levels (resolution/data rates/qualities). As mentioned above, that mechanism nevertheless assumes that there exist as many transcoders as there are levels that it is desired to generate (ten in this example). Furthermore, it is impossible to access chunks corresponding to a level not specified in the manifest file. The method is therefore expensive and not very flexible.

Figure 2:
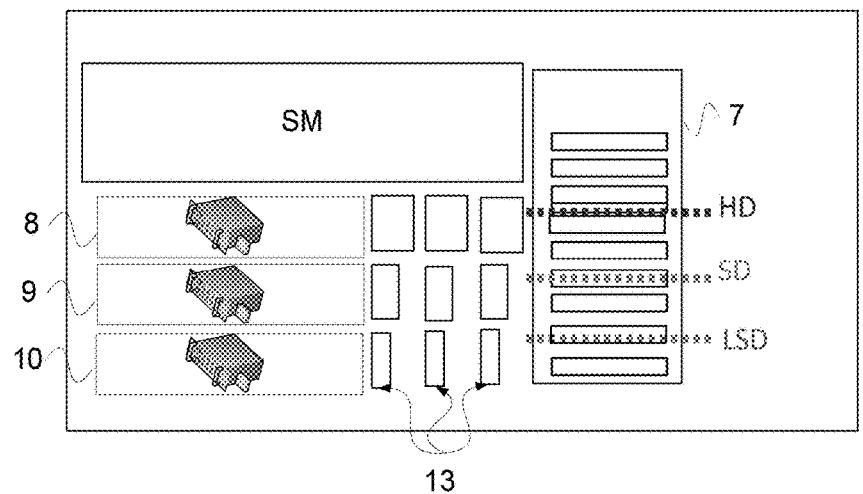
FIG. 2 shows the principle of managing multimedia contents in an implementation of the invention.

That is why the invention proposes, as shown in FIG. 2, limiting the number of levels by taking account of client requests: for example, three target levels may be provided to accommodate as well as possible a pool of client terminals consuming digital TV.

In this embodiment, the description file (7) is the same as in the above example (Appendix 1). It has ten initial levels, from 500 kilobits per second (kb/s-N1) to 15 megabits per second (Mb/s-N1). Three target levels are also predefined: HD (high definition), SD (standard definition), LSD (low standard definition).

For example, these three levels are initialized to correspond to standard data rates: H2 at 10 Mb/s, SD at 4 Mb/s, LSD at 1 MB/s. Three transcoders (8, 9, 10) are associated with these three target levels that are represented in the figure by dotted lines. Each of the transcoders generates in advance a certain number of video chunks (13) in order to be capable of serving the pool of clients in real time.

It should be observed that the invention is more particularly advantageous when the number of initial levels proposed in the description file (7) is high, thus enabling the client pool to be adapted optimally to a small number of target levels.

In this implementation, a plurality of clients (2-4) of the local network seek to consume streaming content. To do this, they conventionally download the manifest file and select the appropriate level.

On each request coming from a client, the management module of the gateway in charge of the streaming (the streaming manager—"SM") takes account of this data in order to update its own statistics. This updating enables it continuously to adjust the data rate to be associated with each target level, and thus with each transcoding profile, in order to obtain the desired distribution for the pool of terminals.

The data rate associated with each level may be calculated using a certain number of statistical constraints, by way of example and in non-limiting manner:

- a certain percentage of clients benefiting from the target data rate (30% of the pool of clients are eligible for HD, 60% for SD, 100% for LSD);
- a certain number of clients is calculated to benefit from each target level (e.g. one thousand clients eligible for HD);
- a clustering algorithm is used to calculate the best distribution, e.g. the distribution that minimizes the sum of the distances between the real capabilities of clients in terms of data rate (and/or resolutions, etc.) and the data rates of the associated target levels;
- it is also possible to define a minimum threshold that is not to be crossed for each target level. For example, whatever the characteristics of the format requested by clients, there may be a ban on dropping below 6 Mb/s for an HD type profile, 3 Mb/s for SD, etc.;
- specific identification of clients can also lead to weighting that might influence the choice of target level: for example, a client who has paid for a better quality of service (a "premium" client) may be switched to a higher target level by having weighting that is greater than that of an ordinary client. A service or network operator can also decide to give precedence to its own clients to the detriment of others, etc.;
- etc.

At the end of updating, if one of the target levels associated with a profile (HD, SD, LSD) has changed, the manager (SM) sends a command to the corresponding transcoder (8-10) so that it adapts to the new level and thus to the variation in client characteristics.

Thus, in this example, the target HD data rate calculated in real time by the server may be 7 Mb/s instead of the initially specified 6 Mb/s (since 30% of the active clients in the pool are requesting formats greater than or equal to 7 Mb/s), the SD data rate may be 2.3 Mb/s instead of 3 Mb/s (in order to reach 70% of the pool), and the LSD data rate may be 1.2 Mb/s (in order to reach 100% of the eligible pool).

Once this updating has been performed, the manger (SM) can prepare the transcoders (8-10) and supply the video segments (13) as a function of client requests. If, after recovering the manifest file, a client should by way of example express the desire to access the quality corresponding to the 2.5 Mb/s data rate, then the server supplies that client with content segments pre-encoded at 2.3 Mb/s (the new target level calculated for the SD profile).

Without going beyond the ambit of the invention, it is possible, as an alternative, to proceed with sending initial chunks to a client before updating the value of the target level.

If a client has not made a request during a predefined length of time, or if a client has ceased to consume content (C), the manager (SM) takes account of this in order to remove that client from the pool of active clients and in order to update the statistics for the cluster to which the client in question belongs, in particular by recalculating the target level.

The transcoding system of the invention thus makes it possible to adapt dynamically and closely to requests from client terminals, while using a limited number of transcoders (in this example three transcoders for three target levels instead of ten transcoders for the ten initial levels).

Figure 3:
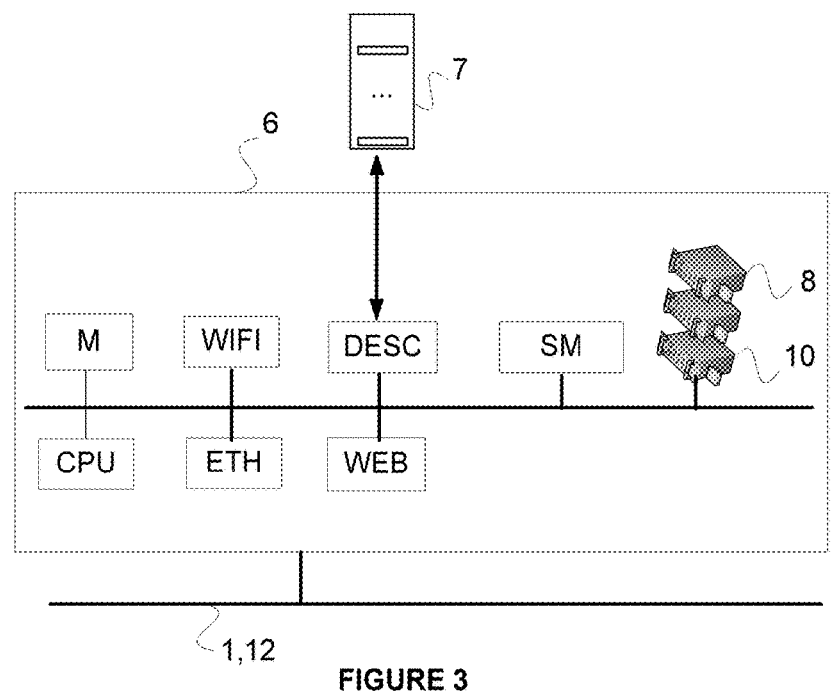
FIG. 3 shows the architecture of a service gateway performing an implementation of the invention.

FIG. 3 shows the architecture of equipment that performs an implementation of the invention, such as for example the service gateway (6) of FIG. 1 that includes, amongst other things, the management module SM of the invention in charge of adaptive streaming.

In conventional manner, the equipment comprises memories (M) associated with a central processor unit (CPU). The memories may be of the read only memory (ROM) type or of the random access memory (RAM) type, or indeed they may be of the Flash type. The gateway (6) communicates with the local network (1) and with the broadband network (12) via an Ethernet module (ETH) and possibly also a WiFi module for local wireless communication. It makes a web site available to which client terminals connect in order to search for manifest files.

In addition, and in accordance with the invention, the service gateway (6) includes a streaming management module SM and a set of transcoders (8-10). The module SM, which may be software and/or hardware, is capable in particular of supplying and adapting the target levels (Ri) dynamically as a function of requests from clients, and then of controlling the transcoders (8-10) that are attached to the various target levels.

The service gateway (6) of the invention can thus contain a hard disk for storing video chunks, and possibly other modules, such as for example an access control module, a video interface module, etc.

Figure 4:
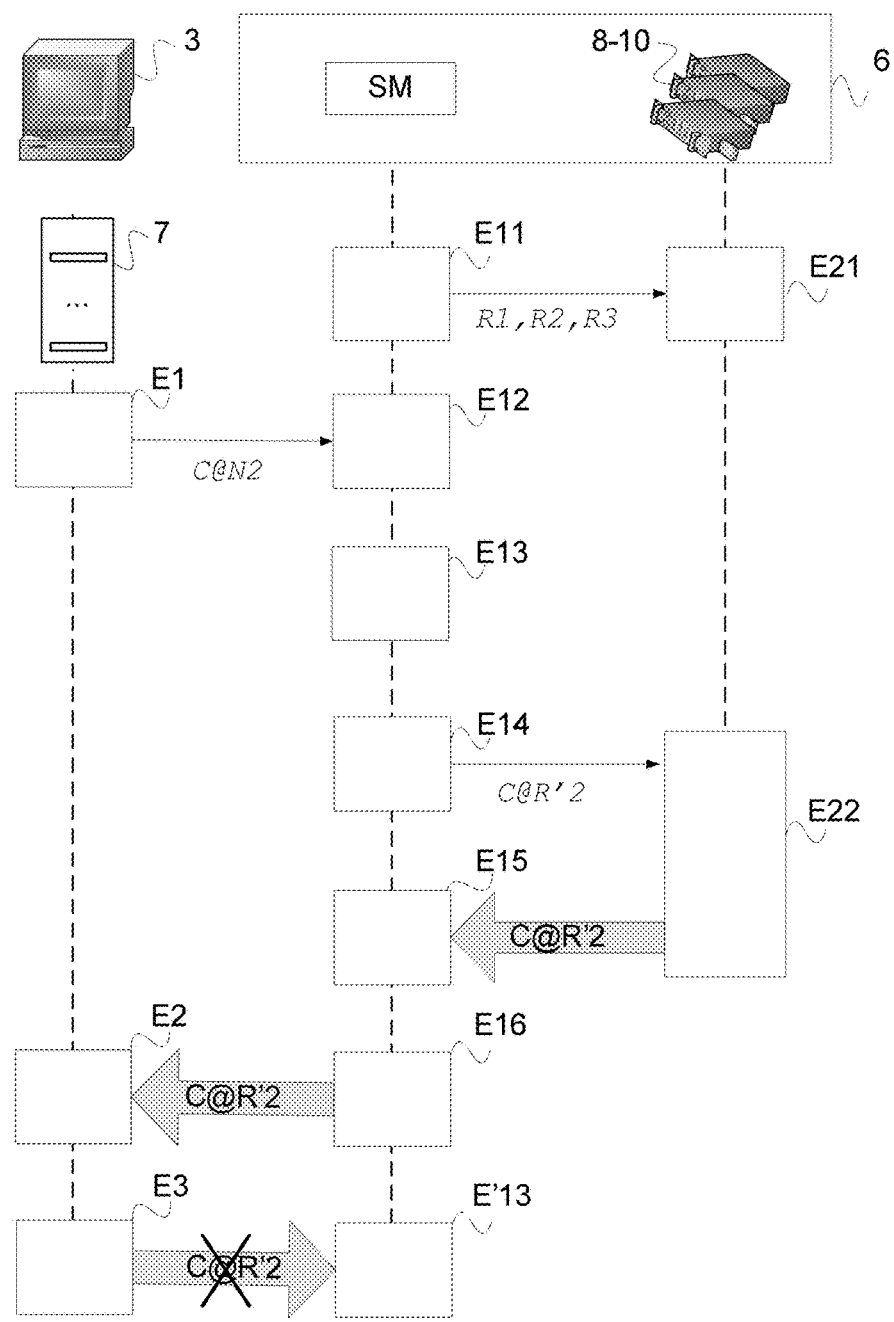
FIG. 4 is a timing chart in an implementation of the invention.

FIG. 4 describes the various steps of streaming in an implementation of the invention, as a timing diagram.

During an initialization step E11, the streaming management module SM of the gateway (6) initializes a certain number of target output levels. In this example, and as described above, these are three levels HD (high definition), SD (standard definition), and LSD (low standard definition), and they are initialized respectively at 10 Mb/s, 4 Mb/s, and 1 Mb/s.

Theater, during this same step E11, the management module SM instructs the transcoder modules (8-10) to generate the first video chunks of the initial target levels (R1, R2, R3), and optionally stores the files corresponding to these first video chunks on a disk, and then pauses the video transcoder module. Subsequently, a client terminal can receive from the gateway one of the chunks as previously generated, at a level that is lower than or equal to the level that the client actually requested, and the client can thus consume it.

As explained above, before having access to the first segment of the video (C) that a client seeks to view, the client terminal must begin by recovering the manifest description file (7). It is assumed in this example that the terminal (3) has already received the description file "C.mpd" (7) that has been transmitted thereto by the service platform (6), in this example.

During a step E12, the client terminal analyses the description file (7) and requests content corresponding to the desired characteristics (data rate/resolution/quality) of the level N2 (C@N2).

During a step E12, the module SM receives this request.

During a following step E13, it calculates new statistics about the pool of client terminals, and possibly updates one or more target levels, by using one or more of the above-mentioned algorithms (clustering, etc.). In this example, the requested level N2 (2.5 Mb/s) lies between the target level R2 and the target level R3. By way of example, an adaptation calculation using the clustering algorithm may make it possible, for the management module SM to modify the levels R'1 and R'2 of the target levels while taking account of the new data (N2). In this example, the level R3 is unaffected (R'3=R3).

During a step E14, the management module SM transmits the request from the client (C@R'2) to the transcoders (8-10) in the new, adapted target format (R'2), i.e. in one of the formats that were calculated during step E13. The transcoder that is dedicated to this level (in this example SD), can then generate the following chunks in compliance with the updated level that is the closest to the request from the client terminal (R'2, 2.3 Mb/s) during a step E22.

The corresponding chunks are optionally stored on the disk (E15) and transmitted to the client terminal during a step E16.

Naturally, the above steps may be inverted, i.e. the chunks corresponding to the preceding target level (R2) may be transmitted to the client while waiting for the target level (R'2) to be updated.

The transcoder controlled by the streaming management module (SM) thus continues to generate chunks dynamically while complying with the pause stages and servo-control stages until the end of reading the video content, which may be viewed on the client terminal during an optional step E2.

When the client (3) has finished consuming the content C (step E3), a new calculation step E'13 may be performed in order to update statistics by removing the client (3) from the cluster to which the client was attached.

During a new request from a client terminal for a new manifest description file (7), steps E11 to E15 are performed again by the service gateway.

In a variant that is not shown, the invention relies on a description file that is organized by data rate ranges. Such a file, e.g. corresponding to a future variant of the MPEG-DASH or HLS standards, serves to specify upper and lower bounds for a set of ranges, each range representing a level. For example, if the client data rate lies between the two bounds of a range, the client is associated with that range. In the invention, the statistics can then be calculated and updated in each range in order to establish the target data rate of the range as appropriately as possible, i.e. the actual data rate of transcoding.

An extract from such an HLS file, setting out the ranges of values associated with the data rate of the video is proposed below. It should be observed that this is merely an example, and in particular that other characteristic values, such as for example spatial resolution, could also be defined in the form of ranges. In this example, the targeted range extends from 200 kb/s (BIRATEMIN=200000) to 2 Mb/s (BITRATEMAX=2000000), and in this range the client terminal may select data rate by increments of 1 kb/s (BITRATESTEP=1000).

```
#EXTM3U
#EXT-X-STREAM-INF:PROGRAM-ID=1, BITRATEMIN=200000,
BITRATEMAX=2000000,BITRATESTEP=1000;
stream/content.m3u8
```

In this variant, the HAS client can select very accurately the values that are closest to an ideal target. By way of example, these values may be specified by the client to the server using parameters that are transmitted together with the HTTP requests for recovering the various video segments.

Naturally, the above-described embodiment is given purely by way of non-limiting indication and numerous modifications may easily be made thereto by the person skilled in the art without thereby going beyond the ambit of the invention.

APPENDIX 1

An example MPEG-DASH manifest file

```
<?xml version="1.0"?>
<MPD
xmlns:xsi="http://www.w3.org/2001/XMLSchema-instance"
xmlns="urn:mpeg:DASH:schema:MPD:2011"
xsi:schemaLocation="urn:mpeg:DASH:schema:MPD:2011 DASH-MPD.xsd"
type="dynamic"
minimumUpdatePeriod=" PT1.0S "
profiles="urn:mpeg:dash:profile:isoff-live:2011">
<Representation id="0" codecs="avo1" mimeType="video/mp4"
width="320" height="240" startWithSAP="1" bandwidth="46986">
    • <BaseURL>http://x.com/content</BaseURL>
<SegmentBase>
    • <Initialization
sourceURL="content_1s_500 kbit/content_500 kbit_dash.mp4"/>
    • </SegmentBase>
    • <SegmentList duration="1">
    • <SegmentURL media="content_1s_500kb/content_1s1.m4s"/>
    • <SegmentURL media="content_1s_500kb/content_1s2.m4s"/>
    • <SegmentURL media="content_1s_500kb/content_1s3.m4s"/>
    • ... .
</SegmentList>
    • <SegmentList duration="1">
    • <SegmentURL
media="content_1s_1000kb/content_1s1.m4s"/>
    • <SegmentURL
media="content_1s_1000kb/content_1s2.m4s"/>
    • <SegmentURL
media="content_1s_1000kb/content_1s3.m4s"/>
    • ... .
</SegmentList>
    • <SegmentList duration="1">
    • <SegmentURL
media="content_1s_2000kb/content_1s1.m4s"/>
    • <SegmentURL
media="content_1s_2000kb/content_1s2.m4s"/>
    • <SegmentURL
media="content_1s_2000kb/content_1s3.m4s"/>
    • ... .
</SegmentList>
    • ... .
<SegmentList duration="1">
    • <SegmentURL
media="content_1s_15000kb/content_1s1.m4s"/>
    • <SegmentURL
media="content_1s_15000kb/content_1s2.m4s"/>
    • <SegmentURL
media="content_1s_15000kb/content_1s3.m4s"/>
    • ... .
</SegmentList>
    • </MPD>
```

The invention claimed is:

1. A method comprising:
    managing a multimedia content suitable for being played back by a plurality of terminals of a network connected to a service gateway, said multimedia content being proposed at a plurality of initial levels and transcoded in at least one target level, said terminals being clustered in groups where each terminal of a respective group has the same target level, wherein managing comprises the following acts performed by a multimedia managing device:

receiving a request from a terminal of the plurality of terminals for playing back the multimedia content at a first initial level;

assigning the terminal to the target level if the terminal is not assigned; and updating at least the target level for said group of terminals that is associated with the assigned target level as a function of the group of terminals and the first initial level of the request.

2. The method according to claim 1, wherein updating at least the target level is followed by:

causing the multimedia content to be transcoded at said updated target level; and making the multimedia content available at the updated target level.

3. The method according to claim 1, wherein the initial levels specify at least one lower data rate bound and at least one upper data rate bound, and at least one data rate of a target level lies between the lower data rate bound and the upper data rate bound.

4. The method according to claim 1, wherein the initial levels are described in a description file of the multimedia content, which is digital content.

5. The method according to claim 1, wherein the target level for the group is updated such that the target level optimizes the play back of the multimedia content for all the terminals of the group.

6. The method according to claim 1, further comprising updating the group of terminals for the target level.

7. The method according to claim 1, wherein updating the target level comprises updating a data rate of the target level for said group of terminals.

8. A device for managing a multimedia content suitable for being played back by a plurality of terminals of a network connected to a service gateway, said multimedia content being proposed at a plurality of initial levels and transcoded in at least one target level, said terminals being clustered in groups where each terminal of a respective group has the same target level, wherein said device comprises:

a processor; and a non-transitory computer-readable medium comprising instructions stored thereon, which when executed by the processor configure the device to perform acts comprising:

receiving a request from a terminal of the plurality of terminals for playing back the multimedia content at a first initial level;

assigning the terminal to the target level if the terminal is not assigned; and updating at least the target level for said group of terminals that is associated with the assigned target level as a function of the group of terminals and the first initial level of the request.

9. The device according to claim 8, wherein the device is comprised in the service gateway.

10. The device according to claim 8, wherein the instructions configure the device to update the target level for the group such that the target level optimizes the play back of the multimedia content for all the terminals of the group.

11. The device according to claim 8, wherein the instructions configure the device to update the group of terminals for the target level.

12. The device according to claim 8, wherein updating the target level comprises updating a data rate of the target level for said group of terminals.

13. A non-transitory computer-readable medium comprising a computer program stored thereon and including code instructions for performing a method of managing a multimedia content by a multimedia managing device when the program is executed by a processor of the device, wherein the multimedia content is suitable for being played back by a plurality of terminals of a network connected to a service gateway, said multimedia content being proposed at a plurality of initial levels and transcoded in at least one target level, said terminals being clustered in groups where each terminal of a respective group has the same target level, and wherein the instructions comprise:

instructions that configure the multimedia managing device to receive from a terminal of the plurality of terminals a request for playing back the multimedia content at a first initial level;

instructions that configure the multimedia managing device to assign the terminal to the target level if the terminal is not assigned; and instructions that configure the multimedia managing device to update the target level for said group of terminals that is associated with the assigned target level as a function of the group of terminals and the first initial level of the request.

14. The non-transitory computer-readable medium according to claim 13, wherein the target level for the group is updated such that the target level optimizes the play back of the multimedia content for all the terminals of the group.

15. The non-transitory computer-readable medium according to claim 13, further comprising instructions that configure the multimedia managing device to update the group of terminals for the target level.

16. The non-transitory computer-readable medium according to claim 13, wherein updating the target level comprises updating a data rate of the target level for said group of terminals.

* * * * *